US012786891B2

(12) United States Patent
Goldstein et al.

(10) Patent No.: US 12,786,891 B2
(45) **Date of Patent: *Nov. 3, 2026**

(54) DISTRIBUTED UNIT MONITORING OF USER EQUIPMENT TRANSMITTER POWER DEGRADATION

(71) Applicant: Dell Products L.P., Round Rock, TX (US)

(72) Inventors: Eran Goldstein, Montreal (CA); Mohammed Abdelsadek, Kanata (CA); John Bradley Deforge, Chelsea (CA); Jayaram Venguduswamy Srinivasan, Nepean (CA)

(73) Assignee: Dell Products L.P., Round Rock, TX (US)

( * ) Notice: Subject to any disclaimer, the term of this patent is extended or adjusted under 35 U.S.C. 154(b) by 267 days.

This patent is subject to a terminal disclaimer.

(21) Appl. No.: 18/624,294

(22) Filed: Apr. 2, 2024

(65) Prior Publication Data

US 2025/0310896 A1 Oct. 2, 2025

(51) Int. Cl.
*H04W 52/24* (2009.01)

(52) U.S. Cl.
CPC .................................. *H04W 52/242* (2013.01)

(58) Field of Classification Search
None
See application file for complete search history.

(56) References Cited

U.S. PATENT DOCUMENTS

| | | | | |
|---|---|---|---|---|
| 5,983,085 | A * | 11/1999 | Zamat ...................... | H04B 1/04 455/127.1 |
| 7,082,108 | B2 | 7/2006 | Hwang et al. | |
| 7,302,276 | B2 | 11/2007 | Bernhardsson et al. | |
| 7,809,073 | B2 | 10/2010 | Liu | |
| 8,036,697 | B2 | 10/2011 | Asanuma | |
| 8,843,172 | B2 | 9/2014 | He et al. | |

(Continued)

OTHER PUBLICATIONS

3GPP "3rd Generation Partnership Project; Technical Specification Group Radio Access Network; NR; Physical channels and modulation (Release 18)" 3GPP, 3GPP TS 38.211 V18.1.0 (Dec. 2023), 159 pages.

(Continued)

*Primary Examiner* — Pablo N Tran
(74) *Attorney, Agent, or Firm* — Amin, Turocy & Watson, LLP

(57) ABSTRACT

Distributed unit monitoring of user equipment transmitter power degradation (e.g., using a computerized tool), is enabled. For example, a system can comprise a processor and a memory that stores executable instructions that, when executed by the processor, facilitate performance of operations. The operations can comprise determining an average of differences between uplink path losses between a cellular node and a fixed wireless access device and downlink path losses between the cellular node and the fixed wireless access device. The operations can further comprise, in response to the average of the differences between the uplink path losses and the downlink path losses being determined to satisfy a defined difference threshold, determining that the fixed wireless access device is not transmitting according to a specified power level.

20 Claims, 10 Drawing Sheets

(56) References Cited

U.S. PATENT DOCUMENTS

| | | | | |
|---|---|---|---|---|
| 8,897,231 | B2 * | 11/2014 | Sawahashi | H04L 5/0064 370/329 |
| 8,929,227 | B2 | 1/2015 | Lee et al. | |
| 8,937,917 | B2 | 1/2015 | Jung et al. | |
| 8,989,655 | B2 * | 3/2015 | Kang | H04B 7/0802 455/562.1 |
| 9,148,858 | B2 | 9/2015 | Park et al. | |
| 9,313,751 | B2 | 4/2016 | Englund et al. | |
| 9,374,802 | B2 * | 6/2016 | Siomina | H04W 4/029 |
| 9,642,114 | B2 * | 5/2017 | Fong | H04L 1/0026 |
| 9,655,055 | B2 | 5/2017 | Morita et al. | |
| 9,661,586 | B2 | 5/2017 | Gao et al. | |
| 9,781,685 | B2 * | 10/2017 | Tsui | H04W 52/243 |
| 9,888,448 | B2 | 2/2018 | Panchal | |
| 9,961,683 | B2 * | 5/2018 | Ali | H04W 72/20 |
| 10,694,409 | B2 | 6/2020 | Ryu et al. | |
| 10,932,199 | B2 | 2/2021 | Li et al. | |
| 11,012,121 | B2 | 5/2021 | Fukui et al. | |
| 11,064,535 | B2 | 7/2021 | Huang et al. | |
| 11,129,039 | B2 | 9/2021 | Ryu et al. | |
| 11,134,514 | B2 | 9/2021 | Fei et al. | |
| 11,234,196 | B2 | 1/2022 | Ryu et al. | |
| 11,343,776 | B2 | 5/2022 | Li | |
| 11,483,843 | B2 | 10/2022 | Sun et al. | |
| 11,502,794 | B2 | 11/2022 | Mochizuki et al. | |
| 11,606,704 | B2 | 3/2023 | Ryu et al. | |
| 11,778,653 | B2 | 10/2023 | Sun et al. | |
| 11,910,213 | B2 | 2/2024 | Ryu et al. | |
| 12,133,249 | B2 | 10/2024 | Sun et al. | |
| 12,160,380 | B2 | 12/2024 | Mochizuki et al. | |
| 12,273,740 | B2 | 4/2025 | Yu | |
| 12,376,115 | B2 | 7/2025 | Qin | |
| 12,425,977 | B2 | 9/2025 | Jin et al. | |
| 2024/0040416 | A1 * | 2/2024 | Hosseini | H04L 5/0094 |
| 2025/0063588 | A1 * | 2/2025 | Kumar | H04L 5/0098 |
| 2025/0261123 | A1 * | 8/2025 | Jang | H04W 52/325 |

OTHER PUBLICATIONS

3GPP "3rd Generation Partnership Project; Technical Specification Group Radio Access Network; NR; Multiplexing and channel coding (Release 18)" 3GPP, 3GPP TS 38.212 V18.1.0 (Dec. 2023), 293 pages.

Non-Final Office Action received for U.S. Appl. No. 18/432,204 dated Feb. 12, 2026, 12 pages.

Notice of Allowance received for U.S. Appl. No. 18/432,204 dated May 29, 2026, 05 pages.

* cited by examiner

DISTRIBUTED UNIT MONITORING OF USER EQUIPMENT TRANSMITTER POWER DEGRADATION

BACKGROUND

User equipment (UE) can comprise customer premises equipment (CPE) which can be utilized by fixed wireless access (FWA) providers. Sometimes, the FWA can exhibit reduced performance, resulting in a reduced user experience.

The above-described background relating to CPE is merely intended to provide a contextual overview of some current issues and is not intended to be exhaustive. Other contextual information may become further apparent upon review of the following detailed description.

DETAILED DESCRIPTION

Figure 1:
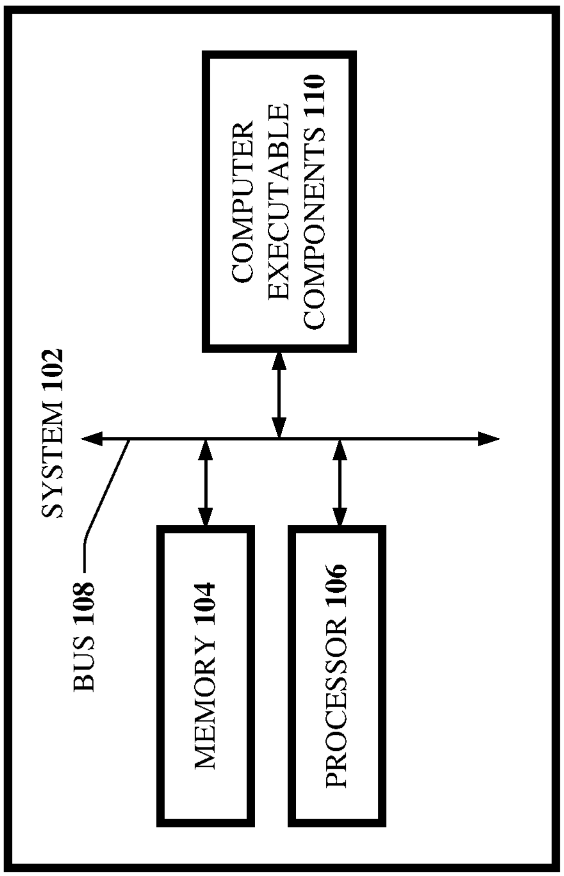
FIG. 1 is a block diagram of a non-limiting example system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, FWA can be improved in various ways, and various embodiments are described herein to this end and/or other ends. The disclosed subject matter relates to FWA performance and, more particularly, to distributed unit monitoring of user equipment transmitter power degradation.

For network optimization, it can be useful to determine when a UE (e.g., a CPE) is underperforming. One such example is when the UE is part of the whole system such in the case of FWA. In this example, the UE (e.g., CPE) provides the internet to remote locations, and from the network perspective, operates as a high capability UE. If a CPE has a soft degradation, it can be helpful to identify and analyze the soft degradation as soon as possible.

A soft degradation in the UE (e.g., CPE) transmitter can degrade the uplink performance, for instance, by reducing the CPE range and reducing the UL throughput. Existing solutions require dedicated hardware for power amplifier (PA) automatic self-testing. Therefore, such solutions are more expensive, and can be faulty or inaccurate. Likewise, not all CPEs support those reporting features to the DU. Another approach is to measure PA power manually, at installation stage and from time to time, which can be expensive. It is noted that, in various implementations, a radio unit (RU) can comprise the PA.

It is noted that CPE units can originate from different providers, thus resulting in differing qualities and/or features. When connecting a CPE to a network, the quality of the integrated system needs to be determined, whether the CPE is well-calibrated needs to be determined, and/or whether the RU properties (e.g., in this case, receiver saturation point) are as specified by the manufacturer needs to be determined. If some soft degradation occurs on the CPE side, such soft degradation can be discovered, for instance, via indirect statistical data collected by the network (e.g., via a base station). However, this can take significant effort and time, and might be hidden, as the information is not direct. Some CPEs can comprise on-the-field power measurement and log capability, however, those could still be faulty, and may not contain all components up to the antenna.

For various reasons, the calibrated CPE (e.g., the whole system including the antennas) transmitted power could be impacted by heating, aging, mechanical damage, humidity, or other suitable factors. Such nonlimiting factors can impact the power in different transmitter (Tx) components, such as antenna, cables, connectors, PA, or other suitable components.

In various embodiments, a network (e.g., DU) can measure if a CPE transmitted power declined or deviated from nominal. In various example embodiments herein, a network (e.g., via a base station or a gNodeB) can measure the path loss using two sources: (1) UE observed path loss, which is based on DL power; and (2) base-station observed path-loss, which is based on UL power. The network (e.g., via a system herein) can then compare these two measurements. A difference between the two measurements is indicative of a different UL power as compared to the broadcasted desired value. As the input signal may contain noise, values to utilize should have a high-enough signal to noise ratio (SNR) above the noise, in addition to applying standard noise and interference estimation techniques to reduce the impact on the signal power estimation. It is note that example embodiments herein are applicable to time division duplexing (TDD) networks in which reciprocity occurs over the same resource, and for frequency division duplexing (FDD) networks. A detected error can be forwarded (e.g., via a system herein) to an entity and/or handled locally to minimize impact until a fix is provided. In a more general sense, the network can benefit from additional metric data, which can be useful for predictive modeling relating to failures if, for example, the soft failure rate accelerates uncharacteristically (e.g., beyond a defined rate). Additionally, embodiments herein can be utilized in the manufacturing stages of various components herein, and for testing and validating base stations herein.

Embodiments herein can determine whether the transmitted power on an antenna port is lower (or higher) than intended. Such nonlimiting discrepancies can occur, for instance, due to temperature, aging, or mechanical damage of various transmitter components, such as antennas, cables, connectors, PAs, or other suitable components.

According to an example embodiment, a system can comprise a processor, and a memory that stores executable instructions that, when executed by the processor, facilitate performance of operations, comprising determining an average of differences between uplink path losses between a cellular node and a fixed wireless access device, and downlink path losses between the cellular node and the fixed wireless access device, and in response to the average of the differences between the uplink path losses and the downlink path losses being determined to satisfy a defined difference threshold, determining that the fixed wireless access device is not transmitting according to a specified power level.

In one or more example embodiments, the above operations can further comprise, in response to the determining that the fixed wireless access device is not transmitting according to the specified power level, recalibrating a transmission power level applicable to the fixed wireless access device. In this regard, recalibrating the transmission power level can comprise adjusting the transmission power level based on the average of the differences between the uplink path losses and the downlink path losses.

In one or more example embodiments, the cellular node can be part of a time division duplexing cellular network. In one or more example embodiments, the cellular node can be part of a frequency division duplexing cellular network.

In one or more example embodiments, uplink transmissions corresponding to the uplink path losses and downlink transmissions corresponding to the downlink path losses can utilize common resource blocks. In this regard, the common resource blocks can comprise common synchronization signal block channel(s) or common channel state information reference signal channel(s).

In another example embodiment, a non-transitory machine-readable medium can comprise executable instructions that, when executed by a processor, facilitate performance of operations, comprising determining a mean of differences between uplink path losses between network equipment and fixed wireless access equipment and downlink path losses between the network equipment and the fixed wireless access equipment, and in response to the mean of the differences between the uplink path losses and the downlink path losses being determined to satisfy a defined difference criterion, determining that the fixed wireless access equipment is not transmitting according to a defined power level.

In various embodiments, the above operations can further comprise, in response to the determining that the fixed wireless access equipment is not transmitting according to the defined power level, recalibrating a transmission power level applicable to the fixed wireless access equipment. In this regard, recalibrating the transmission power level can comprise adjusting the transmission power level based on the mean of the differences between the uplink path losses and the downlink path losses.

In one or more example embodiments, the network equipment can be part of a time division duplexing cellular network or a frequency division duplexing cellular network.

In one or more example embodiments, at least one of uplink transmissions corresponding to the uplink path losses or downlink transmissions corresponding to the downlink path losses can utilize common resource blocks. In this regard, the common resource blocks comprise common synchronization signal block channel(s) or common channel state information reference signal channel(s).

In yet another example embodiment, a method can comprise determining, by network equipment comprising at least one processor, a result of applying a statistical function to differences between uplink path losses between cellular network equipment and customer premises equipment and downlink path losses between the cellular network equipment and the customer premises equipment, and in response to the result of applying the statistical function to the differences between the uplink path losses and the downlink path losses being determined to satisfy a defined difference threshold, determining, by the network equipment, that the customer premises equipment is not transmitting according to a specified power level.

In one or more example embodiments, the method can further comprise, based on the customer premises equipment being determined not to be transmitting according to the specified power level, recalibrating, by the network equipment, a transmission power level applicable to the customer premises. In this regard, the statistical function applied to the differences can be an average (e.g., a mean) of the differences. Further in this regard, recalibrating the transmission power level can comprise increasing the transmission power level based on the average of the differences between the respective uplink path losses and the corresponding downlink path losses.

In one or more example embodiments, uplink transmissions corresponding to the uplink path losses and downlink transmissions corresponding to the downlink path losses can utilize common resource blocks.

In various embodiments, transmitter power variation can be found, for instance, by comparing the path loss as seen by the UE receiver to the path loss as seen by the base station (e.g., a gNodeB). In unpaired spectrum systems (e.g., TDD) reciprocity can be assumed, and thus path loss can be expected to be equal for uplink and downlink channels (e.g., when using the same portion of the bandwidth).

A UE can estimate path loss ($PL_{UE\_est}$), for instance, by comparing the broadcasted power (e.g., information sent in the first system information block (SIB1) in 4G and 5G) to the received power on its antenna ports:

$$PL_{UE\_est} = P_{gnb\_broadcast} - P_{UE_{Rx}} = PL + e_1 \quad \text{(Equation 1)}$$

A base station can estimate the path loss ($PL_{bs\_est}$) by comparing the UE transmitted power to the received power on its antenna ports:

$$PL_{bs_{est}} = P_{UE,reported} - P_{gnb_{Rx}} = P_{UE,reported} - (P_{UE} - PL - e_2) = (P_{UE,reported} - P_{UE}) + PL + e_2 \quad \text{(Equation 2)}$$

$e_1$ and $e_2$ are the estimation errors caused by the UE for receiver or transmitter side.

Embodiments herein can detect if the desired power is transmitted:

$$P_{UE} = P_{UE,reported} \quad \text{(Equation 3)}$$

or stated otherwise, if ΔP=0 where:

$$\Delta P = P_{UE} - P_{UE,reported} \quad \text{(Equation 4)}$$

$$PL_{bs\_est} = P_{UE,reported} - P_{gnb_{Rx}} = \Delta P + PL + e_2 \quad \text{(Equation 5)}$$

The case where ΔP<0 signifies that the transmitted power is lower than intended.

ΔP can be estimated by subtracting the measurements:

$$\Delta P_{est} = PL_{UE_{est}} - PL_{gnb_{est}} = \Delta P + e_T \quad \text{(Equation 6)}$$

$$\text{Where } e_T = e_1 - e_2$$

To reduce the inaccuracies (e.g., error components), per UE averaging over multiple transmissions can be performed, and over time, it can be assumed that the errors are unbiased.

$$\Delta P_{est,avg} = \sum_{i=1:N} \frac{\Delta P_{est,i}}{N} = \Delta P + \sum_{i=1:N} \frac{e_T}{N} \quad \text{(Equation 7)}$$

Next, the two path loss estimations can be derived.

UE Path Loss Estimation

The transmitted power used by the UE for the PUSCH channel is given by:

$$P_t = \min\{P_{CMAX}, P_0 + \alpha \cdot PL + 10 \cdot \log_{10}(2^{\mu} \cdot M_{RB}) + \Delta_{TF} + \delta\} \quad \text{(Equation 8)}$$

Where:

- $P_{CMAX}$ is the maximum allowed transmit power per carrier;
- $P_0$ is the nominal power, which can be defined as the target received power per one resource block (RB) with subcarrier spacing (SCS) of 15 kHz;
- PL is the estimated path loss at the UE based on a downlink reference signal (channel state information reference signal (CSI-RS) or synchronization signal block (SSB));
- α is the fraction of path loss to be compensated (≤1), which is configured by the network;
- μ and $M_{RB}$ are the numerology of subcarrier spacing and the number of allocated RBs, respectively, which are used to scale the transmit power based on the allocated bandwidth;
- $\Delta_{TF}$ is a factor that is used to account for the information rate transmitted on the uplink channel; and
- δ is a term used to dynamically adjust the uplink power incrementally, by means of transmit power commands (TPCs) sent to the UE via the downlink control information (DCI).

Additionally, the UE power headroom (PHD) is transmitted periodically or via triggers. In various embodiments, the power headroom is the difference between the UE transmitted power and the max power $P_{CMAX}$. By using the power headroom indication, the transmitted power is derived:

$$P_t = P_{CMAX} - PHD \quad \text{(Equation 9)}$$

Plugged back into Equation 8:

$$P_{CMAX} - PHD = \min\{P_{CMAX}, P_0 + \alpha \cdot PL + 10 \cdot \log_{10}(2^{\mu} \cdot M_{RB}) + \Delta_{TF} + \delta\}.$$

In the common case where PHD is positive, (e.g., the UE has enough power to follow the power control loop (e.g., excluding cell edge UEs)), the equation becomes:

$$P_t = P_{CMAX} - PHD = P_0 + \alpha \cdot PL + 10 \cdot \log_{10}(2^{\mu} \cdot M_{RB}) + \Delta_{TF} + \delta \quad \text{(Equation 10)}$$

$$PL_{UE} = \frac{(P_{CMAX} - PHD) - P_0 - 10 \cdot \log_{10}(2^{\mu} \cdot M_{RB}) + \Delta_{TF} + \delta}{\alpha}$$

Since all variables on the right-hand side of Equation 10 are known at the base station side, the network (e.g., a base station such as a gNodeB comprising a system herein) can calculate the path loss seen from the UE side.

On the base station side, a physical uplink shared channel (PUSCH) transmission carrying the PHR is used to estimate the path loss.

The UE transmitted power can be determined using Equation 9 above, and by measuring the received power on the antenna port of the base station, the path loss can be determined (e.g., following Equation 2):

$$PL_{bs\_est} = P_{UE} - P_{gnb_{Rx}} = P_{CMAX} - PHD - P_{gnb_{Rx}} \quad \text{(Equation 11)}$$

It is noted that that the PUCCH and SRS channels could be used in a similar way to obtain more statistical data for averaging. It is additionally noted that, to have the same physical path loss on the base station side as on the UE side, the PUSCH should use the same resources (RBs) as the DL channel that is used by the UE to estimate its path loss (e.g., that is normally the SSB channel or CSI-RS channel), however, this is not a requirement, as further explained herein. Similarly, the same physical antenna on the cell side can be used for the uplink and downlink path loss estimation, for instance, to avoid inaccuracies that can originate from the possible channel differences between antennas. However, those differences would, in most cases, be small over a large bandwidth. In the case of beamforming on the cell side, the same beamforming can be performed on the uplink and downlink side, for the same reasons. Therefore, the L2 scheduler can add periodic allocations of PUSCH+PHR for those purposes (e.g., or use opportunistically occasions thereof). Energy measurement can be more accurate in higher SNR, and therefore only high enough SNR UEs should be used for $\Delta P_{est}$.

In various embodiments, it is assumed that base station transmitted power comprises the same value as the broadcasted information regarding the transmitted power. This can be achieved, for instance, by base station calibration.

In FDD networks, different frequencies are allocated for uplink and downlink transmissions. As the instantaneous PL is not the same across different frequencies, embodiments herein can utilize an assumption that UL and DL path loss are the same is not guaranteed in all use cases. There are two main factors for the path loss differences across difference frequencies: (1) fast fading due to multipath; and (2) antenna gain differences due to different carrier frequency.

In various embodiments, assuming the CPE was tested at installation time, the uplink and downlink path loss difference can be stored and can be used as a reference point. Any change on the path loss difference could be considered as the $\Delta P_{est}$ An error is defined as:

$$\Delta P_{est,avg} > TH_{high} \text{ or } \Delta P_{est,avg} < TH_{low} \quad \text{(Equation 12)}$$

in which the thresholds are as parameter for the implementation.

In the case of an error, scheduler processes can be adjusted; and a message to high layers or another entity can be sent, resulting in a technician fixing the Tx issues. Combined with additional information, the problem with the UE/CPE can be more easily determined and corrected. Some CPEs can comprise the ability to use recalibration to change their transmitter power. Such CPEs can, for instance, correct respective power with the correction information provided by the network.

Additionally, or alternatively, the $\Delta P_{est,avg}$ can be sent (e.g., via a system herein), periodically, to the higher layers or another entity as raw data. In this regard, using a system herein, thresholds for sending a technician can be determined, for instance, without configuring the DU with a set of thresholds. Additionally, the raw data can be analyzed stand-alone, or in conjunction with other raw data (e.g., RU temperature, humidity, cell load, equipment aging, time of day, etc.), and useful correlations (e.g., Tx power drops as temperature exceeds a defined threshold) can be determined (e.g., via a system herein).

Turning now to FIG. 1, there is illustrated an example, non-limiting system 102 in accordance with one or more example embodiments herein. System 102 can comprise a computerized tool, which can be configured to perform various operations relating to distributed unit monitoring of user equipment transmitter power degradation. The system 102 can comprise one or more of a variety of components, such as memory 104, processor 106, bus 108, and/or computer executable components 110. In various embodiments, one or more of the memory 104, processor 106, bus 108, and/or computer executable components 110 can be communicatively or operably coupled (e.g., over a bus or wireless network) to one another to perform one or more functions of the system 102.

Figure 2:
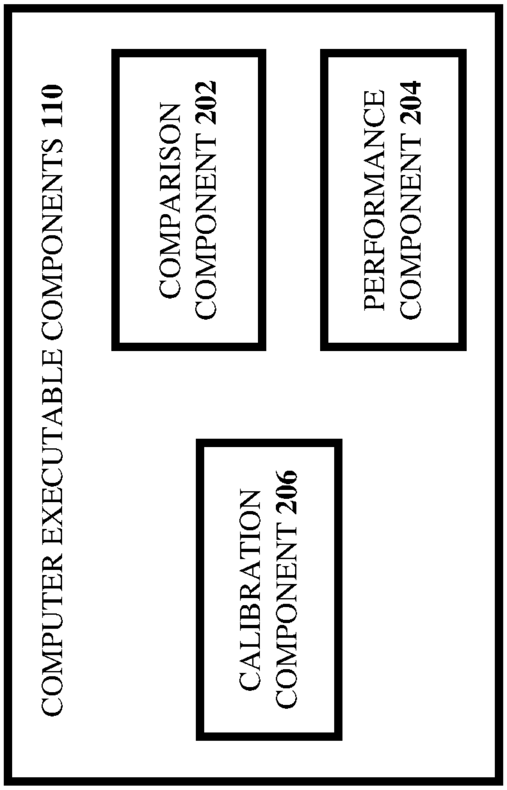
FIG. 2 is a block diagram of a non-limiting example system in accordance with one or more example embodiments described herein.

FIG. 2 illustrates a block diagram of example, non-limiting computer executable components 110 that can facilitate distributed unit monitoring of user equipment transmitter power degradation in accordance with one or more embodiments described herein. Repetitive description of like elements employed in other embodiments described herein is omitted for sake of brevity. As shown in FIG. 2, the one or more computer executable components 110 can comprise comparison component 202, performance component 204, and/or calibration component 206.

In various embodiments, the comparison component 202 can determine an average (e.g., a mean) of differences between (1) uplink path losses between a cellular node (e.g., base station 308) (e.g., a gNodeB) and a FWA device (e.g., FWA device 404), and (2) corresponding downlink path losses between the cellular node (e.g., base station 308) (e.g., a gNodeB) and the FWA device (e.g., FWA device 404). Such nonlimiting FWA devices can comprise for instance, CPE equipment or other suitable FWA devices. In some embodiments, the cellular node (e.g., base station 308) can be part of a TDD cellular network. In further embodiments, the cellular node (e.g., base station 308) can be part of an FDD cellular network.

It is noted that, in various embodiments, uplink transmissions corresponding to the uplink path losses and downlink transmissions corresponding to the downlink path losses can utilize common resource blocks (RBs). In some embodiments, the common RBs can comprise common SSB channel(s). In further embodiments, the common RBs can comprise common CSI-RS channel(s).

In various embodiments, the performance component 204 can, in response to the average of the differences between the uplink path losses and the downlink path losses being determined to satisfy a defined difference threshold, determine that the FWA device (e.g., FWA device 404) is not transmitting according to a specified power level. Such a specified power level can be predefined or can be determined, for instance, using machine learning applied to past power levels and past path losses, other than the instant specified power level and the instant path losses.

In various embodiments, the calibration component 206 can, in response to the determining (e.g., via the performance component 204) that the FWA device (e.g., FWA device 404) is not transmitting according to the specified power level, recalibrate a transmission power level applicable to the FWA device (e.g., FWA device 404). In this regard, recalibrating (e.g., via the calibration component 206) the transmission power level can comprise adjusting (e.g., via the calibration component 206) the transmission power level based on the average of the differences between the respective uplink path losses and the corresponding downlink path losses. In this regard, the FWA device 404 can be recalibrated to actually transmit according to the specified power level.

Figure 3:
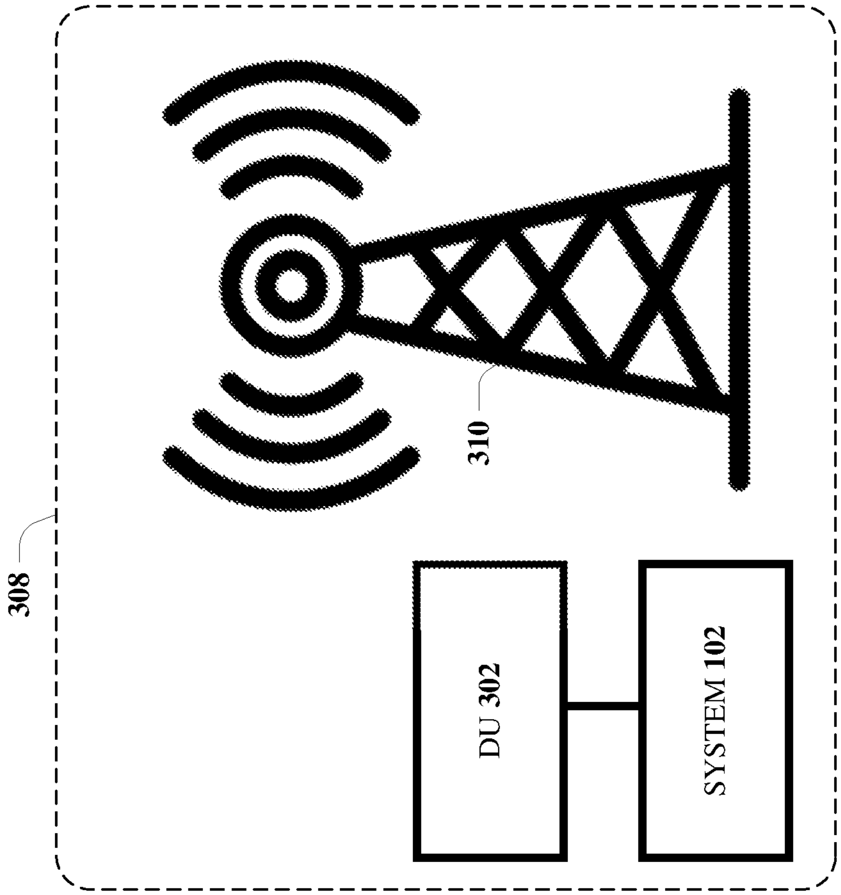
FIG. 3 is a block diagram of a non-limiting example base station in accordance with one or more example embodiments described herein.
Figure 4:
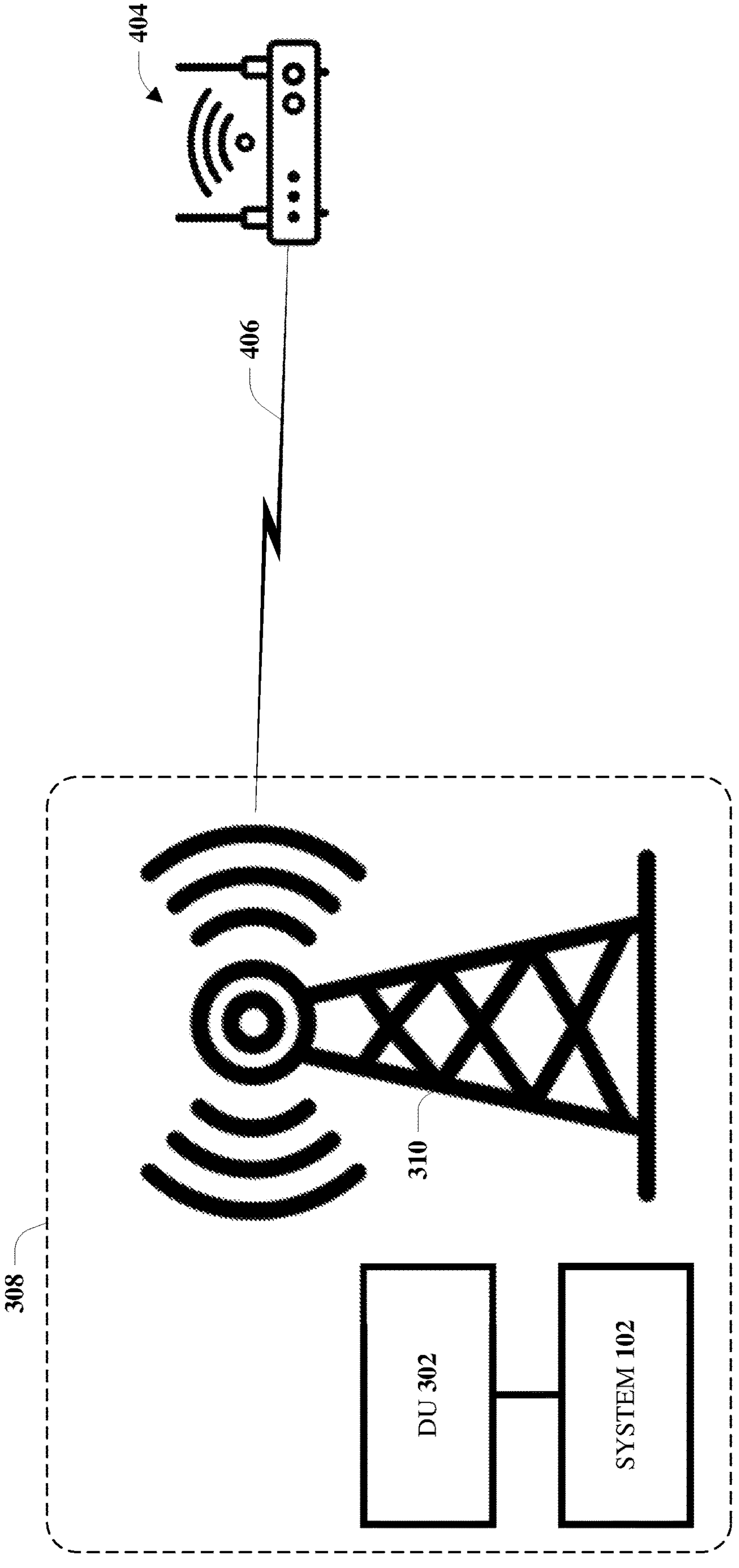
FIG. 4 is a block diagram of a non-limiting example base station in accordance with one or more example embodiments described herein.

FIGS. 3 and 4 illustrate a block diagram of a non-limiting example base station 308 in accordance with one or more example embodiments described herein. In various embodiments, the base station 308 (e.g., a gNodeB) (e.g., a cellular node) can comprise and/or be communicatively coupled to a DU 302, RU 310, and/or system 102. In various embodiments, the base station 308 can be communicatively coupled to one or more FWA devices 404 via respective cellular connections. For instance, the base station 308 can be communicatively coupled to the FWA device 404 via the cellular connection 406. In various embodiments, the DU 302 can comprise and/or be communicatively coupled to the system 102.

Figure 5:
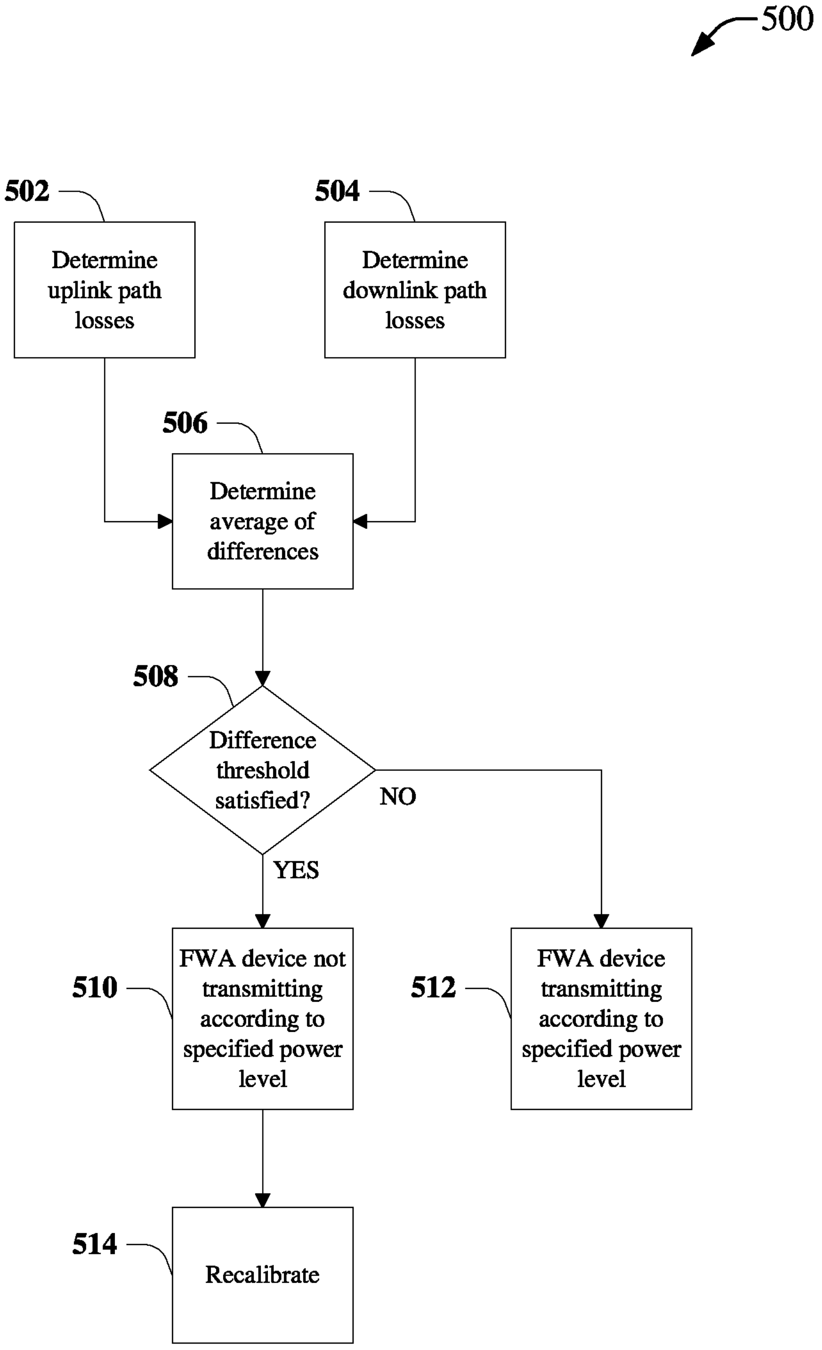
FIG. 5 is a flowchart for a process associated with distributed unit monitoring of user equipment transmitter power degradation in accordance with one or more example embodiments described herein.

FIG. 5 is a flowchart for a process 500 associated with distributed unit monitoring of user equipment transmitter power degradation in accordance with one or more example embodiments described herein. At 502, the comparison component 202 can determine uplink path losses (e.g., between a cellular node, such as a base station 308, and an FWA device (e.g., FWA device 404)). At 504, the comparison component 202 can determine downlink path losses (e.g., between the cellular node, such as the base station 308, and the FWA device 404). At 506, the comparison component 202 can determine an average (e.g., a mean) of differences between the aforementioned uplink path losses and the downlink path losses. At 508, the performance component 204 can determine whether the average (e.g., mean) of the differences between the respective uplink path losses and the corresponding downlink path losses satisfies a defined difference threshold. If the average (e.g., mean) of the differences between the respective uplink path losses and the corresponding downlink path losses satisfies a defined difference threshold (e.g., YES at 508), the process can proceed to 510. If the average (e.g., mean) of the differences between the respective uplink path losses and the corresponding downlink path losses does not satisfy a defined difference threshold (e.g., NO at 508), the process can proceed to 512. At 510, the performance component 204 can determine that the FWA device 404 is not transmitting according to a specified power level. At 512, the performance component 204 can determine that the FWA device 404 is transmitting according to the specified power level. At 514, the calibration component 206 can, in response to the determining (e.g., via the performance component 204) that the FWA device 404 is not transmitting according to the specified power level, recalibrate a transmission power level applicable to the FWA device 404 to be within threshold conformity with the specified power level.

Figure 6:
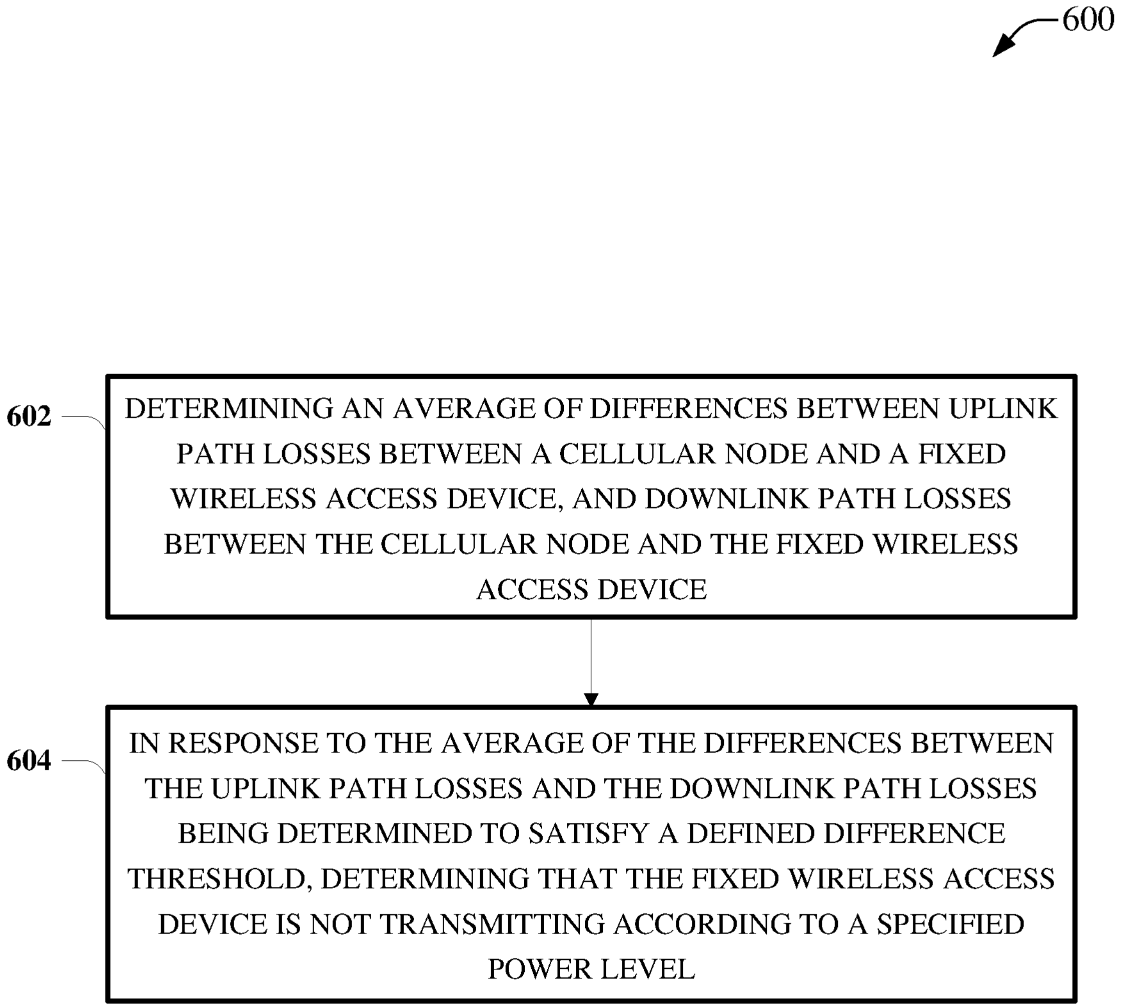
FIG. 6 is a block flow diagram for a process associated with distributed unit monitoring of user equipment transmitter power degradation in accordance with one or more example embodiments described herein.

FIG. 6 illustrates a block flow diagram for a process 600 associated with distributed unit monitoring of user equipment transmitter power degradation in accordance with one or more embodiments described herein. At 602, the process 600 can comprise determining (e.g., via the comparison component 202) an average of differences between uplink path losses between a cellular node (e.g., base station 308) and an FWA device (e.g., FWA device 404), and downlink path losses between the cellular node (e.g., base station 308) and the FWA device (e.g., FWA device 404). At 604, the process 600 can comprise, in response to the average of the differences between the uplink path losses and the downlink path losses being determined to satisfy a defined difference threshold, determining (e.g., via the performance component 204) that the FWA device (e.g., FWA device 404) is not transmitting according to a specified power level.

Figure 7:
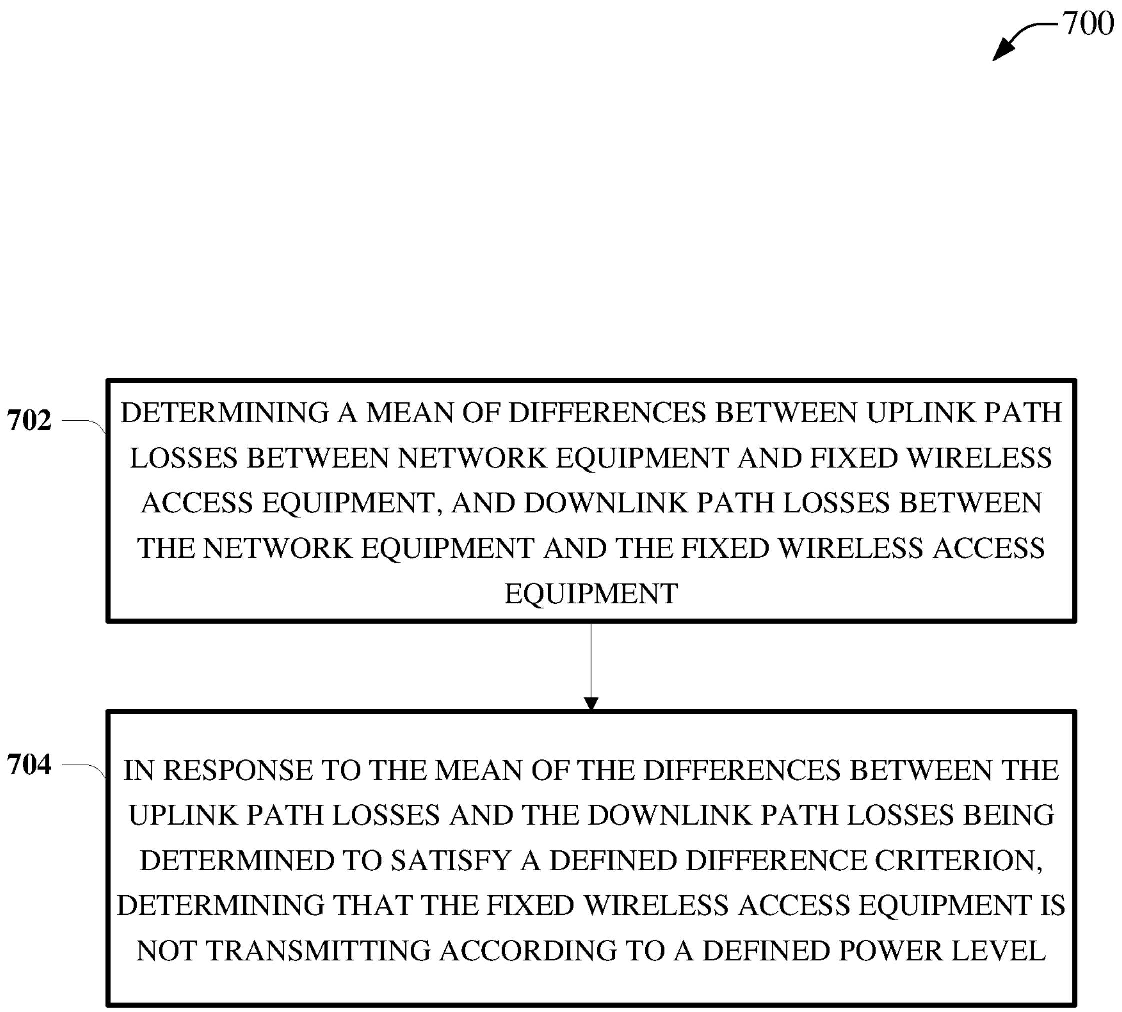
FIG. 7 is a block flow diagram for a process associated with distributed unit monitoring of user equipment transmitter power degradation in accordance with one or more example embodiments described herein.

FIG. 7 illustrates a block flow diagram for a process 700 associated with distributed unit monitoring of user equipment transmitter power degradation in accordance with one or more embodiments described herein. At 702, the process 700 can comprise determining (e.g., via the comparison component 202) a mean of differences between uplink path losses between network equipment (e.g., base station 308) and FWA equipment (e.g., FWA device 404), and downlink path losses between the network equipment (e.g., base station 308) and the FWA equipment (e.g., FWA device 404). At 704, the process 700 can comprise, in response to the mean of the differences between the uplink path losses and the downlink path losses being determined to satisfy a defined difference criterion, determining (e.g., via the performance component 204) that the FWA equipment (e.g., FWA device 404) is not transmitting according to a defined power level.

Figure 8:
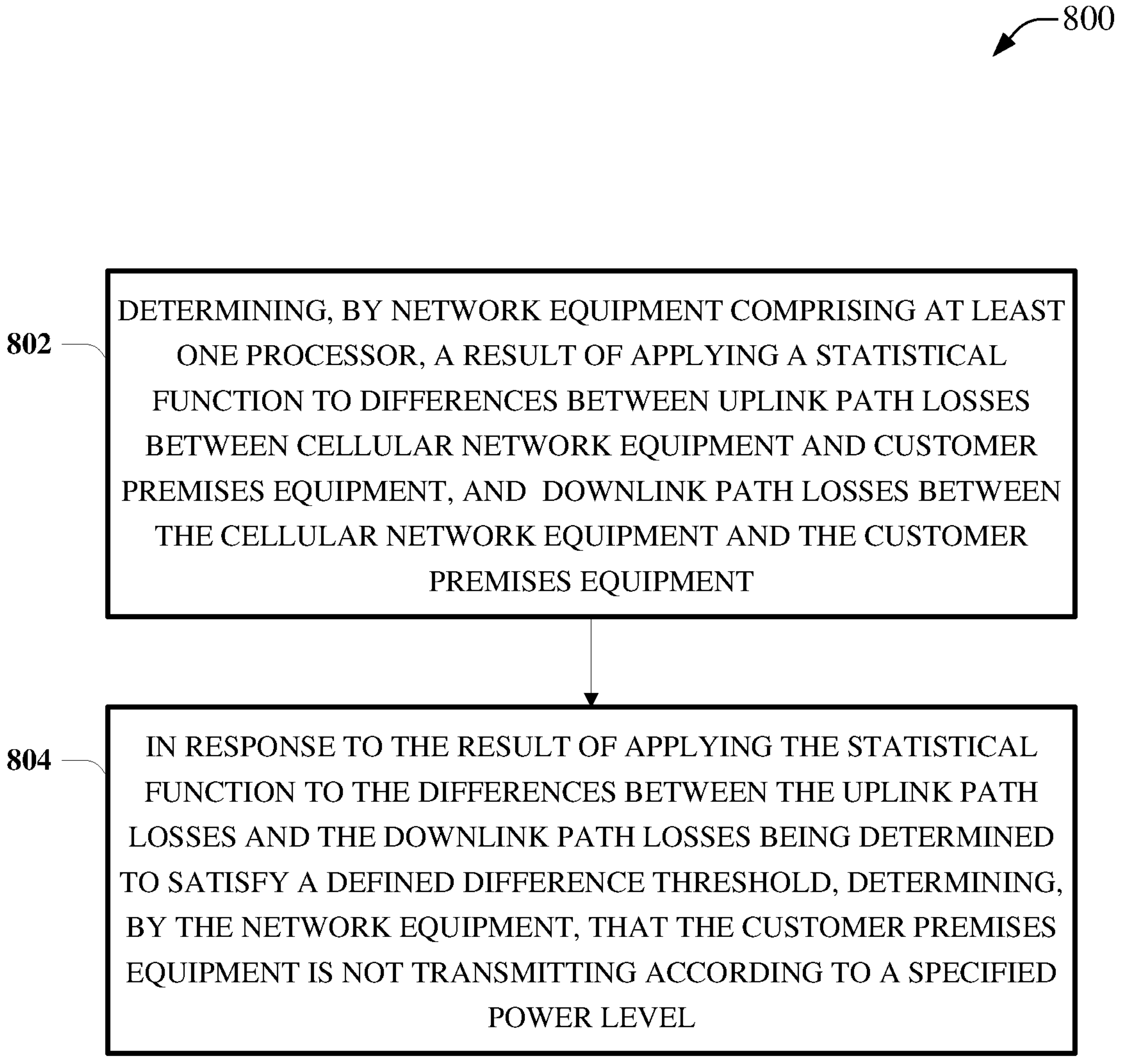
FIG. 8 is a block flow diagram for a process associated with distributed unit monitoring of user equipment transmitter power degradation in accordance with one or more example embodiments described herein.

FIG. 8 illustrates a block flow diagram for a process 800 associated with distributed unit monitoring of user equipment transmitter power degradation in accordance with one or more embodiments described herein. At 802, the process 800 can comprise determining (e.g., via the comparison component 202), by network equipment comprising at least one processor, a result of applying a statistical function to differences between uplink path losses between cellular network equipment (e.g., base station 308) and CPE (e.g., FWA device 404), and downlink path losses between the cellular network equipment (e.g., base station 308) and the CPE equipment (e.g., FWA device 404). At 804, the process 800 can comprise, in response to the result of applying the statistical function to the differences between the respective uplink path losses and the corresponding downlink path losses being determined to satisfy a defined difference threshold, determining (e.g., via the performance component 204), by the network equipment, that the CPE (e.g., FWA device 404) is not transmitting according to a specified power level.

Figure 9:
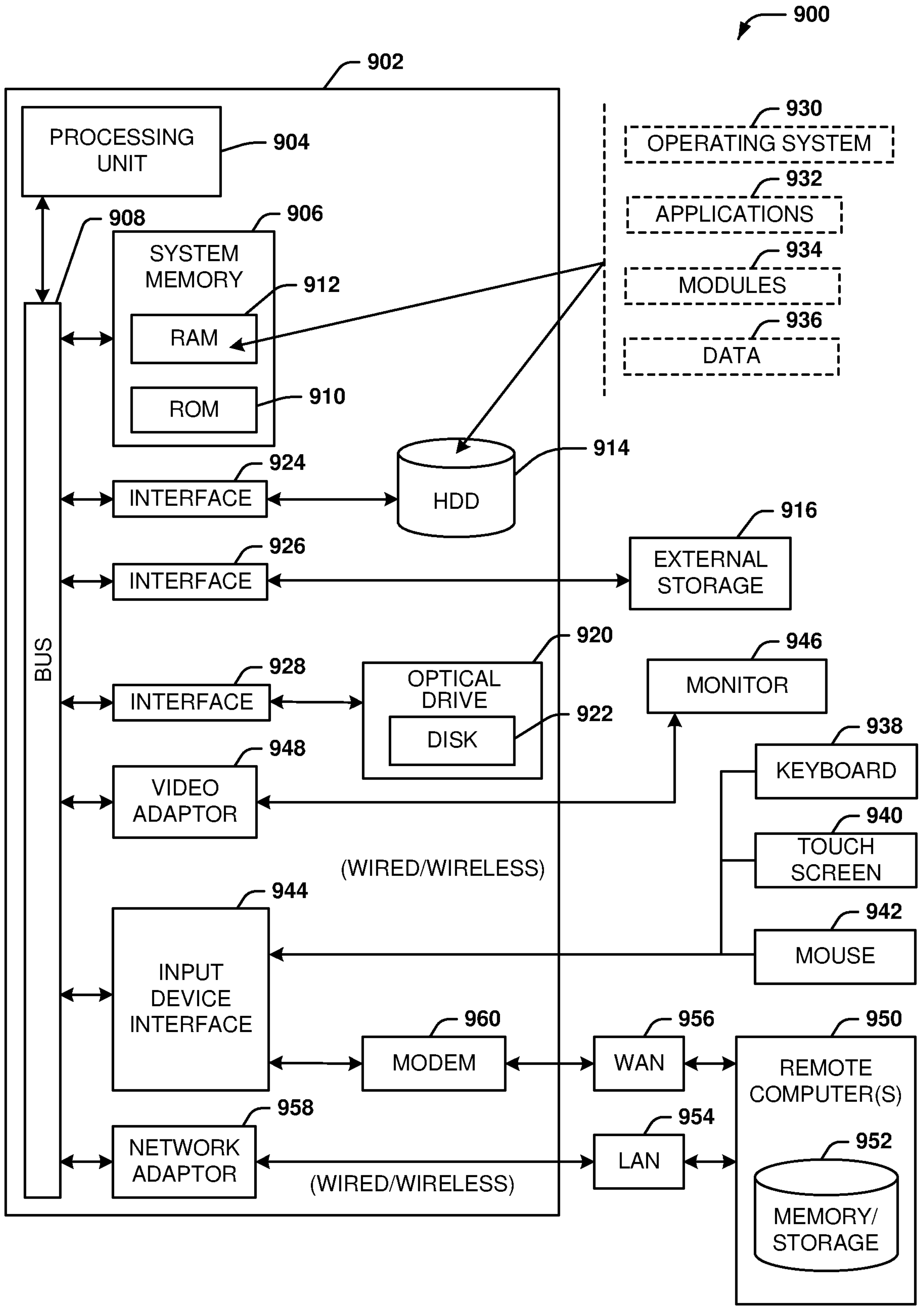
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term “modulated data signal” or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
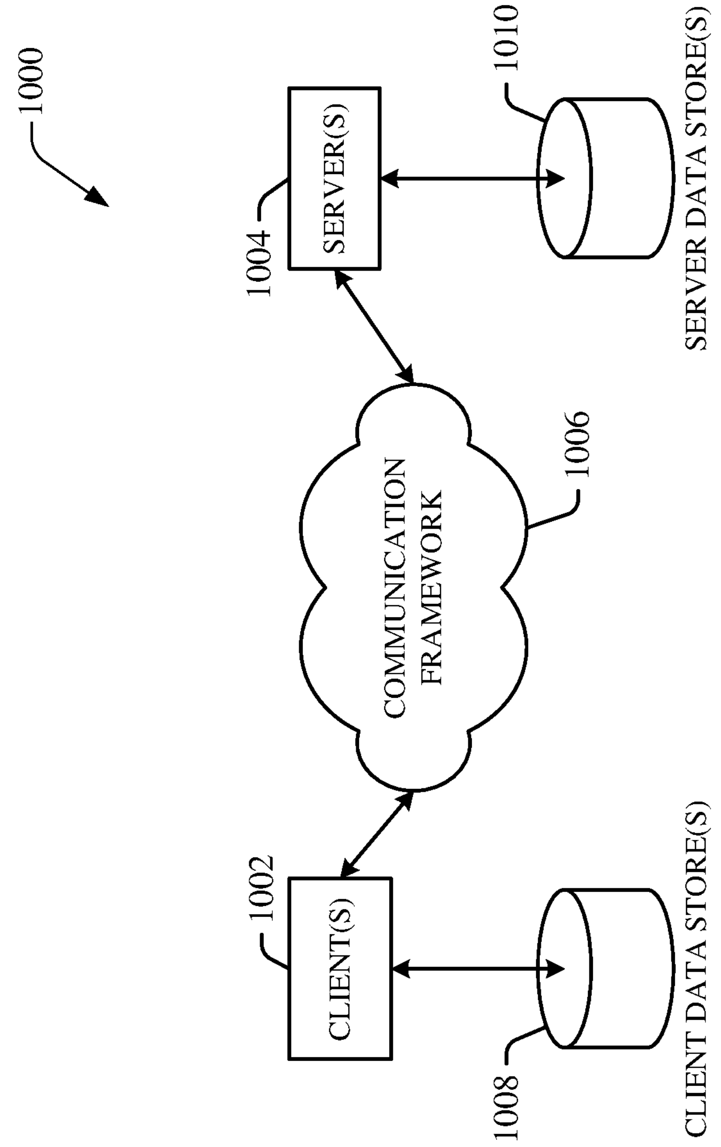
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms “exemplary” and/or “demonstrative” as used herein are intended to mean serving as an example, instance, or illustration. For the avoidance of doubt, the subject matter disclosed herein is not limited by such examples. In addition, any aspect or design described herein as “exemplary” and/or “demonstrative” is not necessarily to be construed as preferred or advantageous over other aspects or designs, nor is it meant to preclude equivalent structures and techniques known to one skilled in the art. Furthermore, to the extent that the terms “includes,” “has,” “contains,” and other similar words are used in either the detailed description or the claims, such terms are intended to be inclusive—in a manner similar to the term “comprising” as an open transition word—without precluding any additional or other elements.

The term “or” as used herein is intended to mean an inclusive “or” rather than an exclusive “or.” For example, the phrase “A or B” is intended to include instances of A, B, and both A and B. Additionally, the articles “a” and “an” as used in this application and the appended claims should generally be construed to mean “one or more” unless either otherwise specified or clear from the context to be directed to a singular form.

The term “set” as employed herein excludes the empty set, i.e., the set with no elements therein. Thus, a “set” in the subject disclosure includes one or more elements or entities. Likewise, the term “group” as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
- at least one processor; and
- at least one memory that stores executable instructions that, when executed by the at least one processor, facilitate performance of operations, comprising:
- determining an average of differences between
  - uplink path losses between a cellular node and a fixed wireless access device, and
  - downlink path losses between the cellular node and the fixed wireless access device; and
- in response to the average of the differences between the uplink path losses and the downlink path losses being determined to satisfy a defined difference threshold, determining that the fixed wireless access device is not transmitting according to a specified power level.

2. The system of claim 1, wherein the operations further comprise:
- in response to the determining that the fixed wireless access device is not transmitting according to the specified power level, recalibrating a transmission power level applicable to the fixed wireless access device.

3. The system of claim 2, wherein recalibrating the transmission power level comprises adjusting the transmission power level based on the average of the differences between the uplink path losses and the downlink path losses.

4. The system of claim 1, wherein the cellular node is part of a time division duplexing cellular network.

5. The system of claim 1, wherein the cellular node is part of a frequency division duplexing cellular network.

6. The system of claim 1, wherein uplink transmissions corresponding to the uplink path losses and downlink transmissions corresponding to the downlink path losses utilize common resource blocks.

7. The system of claim 6, wherein the common resource blocks comprise common synchronization signal block channels.

8. The system of claim 6, wherein the common resource blocks comprise common channel state information reference signal channels.

9. A non-transitory machine-readable medium, comprising executable instructions that, when executed by at least one processor, facilitate performance of operations, comprising:
- determining a mean of differences between
  - uplink path losses between network equipment and fixed wireless access equipment, and
  - downlink path losses between the network equipment and the fixed wireless access equipment; and
- in response to the mean of the differences between the uplink path losses and the downlink path losses being determined to satisfy a defined difference criterion, determining that the fixed wireless access equipment is not transmitting according to a defined power level.

10. The non-transitory machine-readable medium of claim 9, wherein the operations further comprise:
- in response to the determining that the fixed wireless access equipment is not transmitting according to the defined power level, recalibrating a transmission power level applicable to the fixed wireless access equipment.

11. The non-transitory machine-readable medium of claim 10, wherein recalibrating the transmission power level comprises adjusting the transmission power level based on the mean of the differences between the uplink path losses and the downlink path losses.

12. The non-transitory machine-readable medium of claim 9, wherein the network equipment is part of a time division duplexing cellular network.

13. The non-transitory machine-readable medium of claim 9, wherein the network equipment is part of a frequency division duplexing cellular network.

14. The non-transitory machine-readable medium of claim 9, wherein at least one of uplink transmissions corresponding to the uplink path losses or downlink transmissions corresponding to the downlink path losses utilize common resource blocks.

15. The non-transitory machine-readable medium of claim 14, wherein the common resource blocks comprise a common synchronization signal block channel.

16. The non-transitory machine-readable medium of claim 14, wherein the common resource blocks comprise a common channel state information reference signal channel.

17. A method, comprising:

determining, by network equipment comprising at least one processor, a result of applying a statistical function to differences between uplink path losses between cellular network equipment and customer premises equipment, and downlink path losses between the cellular network equipment and the customer premises equipment; and in response to the result of applying the statistical function to the differences between the uplink path losses and the downlink path losses being determined to satisfy a defined difference threshold, determining, by the network equipment, that the customer premises equipment is not transmitting according to a specified power level.

18. The method of claim 17, further comprising:

based on the customer premises equipment being determined not to be transmitting according to the specified power level, recalibrating, by the network equipment, a transmission power level applicable to the customer premises equipment.

19. The method of claim 18, wherein the statistical function applied to the differences is an average of the differences, and wherein recalibrating the transmission power level comprises increasing the transmission power level based on the average of the differences between the uplink path losses and the downlink path losses.

20. The method of claim 17, wherein uplink transmissions corresponding to the uplink path losses and downlink transmissions corresponding to the downlink path losses utilize common resource blocks.

* * * * *